United States Patent [19]

Granger

[11] 4,239,031
[45] Dec. 16, 1980

[54] COMBINATION ROOF STRUCTURE AND SOLAR COLLECTOR

[76] Inventor: Floyd R. Granger, 24 Heard Dr., Greenville, S.C. 29605

[21] Appl. No.: 955,768

[22] Filed: Oct. 30, 1978

[51] Int. Cl.³ .............................. F24J 3/02; F24D 5/04
[52] U.S. Cl. .................................. 126/429; 126/430; 126/436; 126/450; 165/485
[58] Field of Search ............... 126/430, 429, 428, 431, 126/436, 450; 165/485

[56] References Cited

U.S. PATENT DOCUMENTS

| | | | |
|---|---|---|---|
| 3,994,276 | 11/1976 | Pulver | 126/429 |
| 4,027,447 | 6/1977 | Granger et al. | 52/618 |
| 4,051,999 | 10/1977 | Granger et al. | |
| 4,098,260 | 7/1978 | Goettl | 126/429 |
| 4,184,476 | 1/1980 | McArthur | 126/431 |
| 4,196,719 | 4/1980 | Skrivseth | 126/430 |

FOREIGN PATENT DOCUMENTS 2712532  9/1978  Fed. Rep. of Germany ........... 126/450

*Primary Examiner*—Stephen P. Garbe
*Attorney, Agent, or Firm*—Bailey, Dority & Flint

[57] ABSTRACT

A combination roof structure and solar collector for a building having vertical side walls and end walls. A plurality of laterally spaced trusses or bar joists extend from one wall to an opposite wall. A translucent panel is carried on top of the upper members which form part of the truss providing a roof surface for the building while permitting solar energy to pass therethrough. Panels are attached to elongated lower members forming part of the truss so as to define a chamber between the upper members of the truss and the panels. A solar energy absorbing surface is carried above the panels attached to the lower members. Insulation is provided between the solar energy absorbing surface and the interior of the building for insulating the interior of the building from the chamber. Air is circulated through the chamber for absorbing heat from the solar energy absorbing surface and the heated air is supplied to the interior of the building or to a rock storage.

3 Claims, 5 Drawing Figures

COMBINATION ROOF STRUCTURE AND SOLAR COLLECTOR

BACKGROUND OF THE INVENTION

Heretofore solar collectors have been mounted on the roof or the attic of buildings for absorbing solar energy from the sun. The energy from the sun passes through transparent panels mounted in the roof structure for impinging upon black surfaces. As disclosed in our earlier U.S. Pat. No. 4,051,999 the roof was built and a panel was installed in the roof. This permitted the solar energy to pass into the attic and be absorbed by the black floor or surface. This, in turn, heated the air carried within the attic which was subsequently pumped out for heating the building. In our other U.S. Pat. No. 4,027,447 there is disclosed a solar panel which includes first and second translucent panels that are mounted transverse to each other on an inclined roof of a house or the like.

While both of the above structure operate satisfactorily, they require separate construction of the truss, roof and solar panels.

SUMMARY OF THE INVENTION

The invention includes a combination roof structure and solar collector for a building having vertical side walls and end walls. A plurality of laterally spaced trusses extend from one of the walls to an opposite wall. Each of the trusses includes an elongated horizontally extending upper member, an elongated lower member vertically spaced below the upper member, and braces extending between the upper member and the lower member. A translucent panel is carried on top of the upper members providing a roof surface for the building, while permitting solar energy to pass therethrough into the building. Panels in the form of sheets of plywood, are attached to the elongated lower members of the truss defining a chamber between the upper members of the truss and the lower members. A solar energy absorbing surface is carried above the panels attached to the lower members. In one particular embodiment a layer of insulation is carried on the panels attached to the lower members with the solar energy absorbing surface being positioned on top thereof. In another embodiment, insulation is carried on a ceiling that is dropped from the lower members forming the truss. In both situations the insulation insulates the chamber defined between the solar energy absorbing surface and the translucent panels. Air is circulated through the chamber for absorbing heat from the solar energy absorbing surface and supplying the heat to the interior of the building or to a rock storage.

Accordingly, it is an object of the present invention to provide a structure that acts as both a roof and solar collector for a building.

Still another important object of the present invention is to provide a simple and economical combination roof structure and solar collector.

Still another important object of the present invention is to provide a combination roof structure and solar collector that can be readily mounted on a building to provide a horizontal roof surface and solar collector or on a sloping roof and solar collector.

These and other objects and advantages of the invention will become apparent upon reference to the following specification, attendant claims, and drawings.

DESCRIPTION OF A PREFERRED EMBODIMENT

Figure 1:
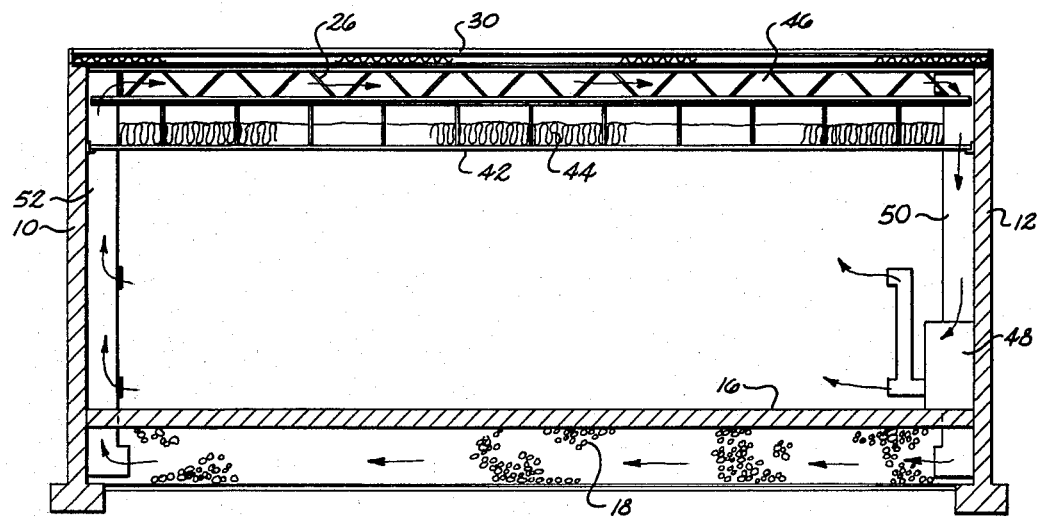
FIG. 1 is a side elevational sectional view illustrating a building having a combination roof structure and solar collector constructed in accordance with the present invention mounted thereon.

Referring in more detail to FIG. 1 of the drawing there is illustrated a building which includes side walls 10 and 12 that are joined by end walls 14. The side and end walls may be constructed of any suitable material such as block. A floor 16 is provided in the building and may be constructed in any conventional manner. Positioned below the floor is a rock bed through which air is circulated either to transfer heat from the air to the rocks or from the rocks to the air depending on the air being circulated through the rocks. As illustrated in FIG. 1, the rock bed is being used to absorb heat from the air heated by the solar collector forming part of the roof structure.

Figure 2:
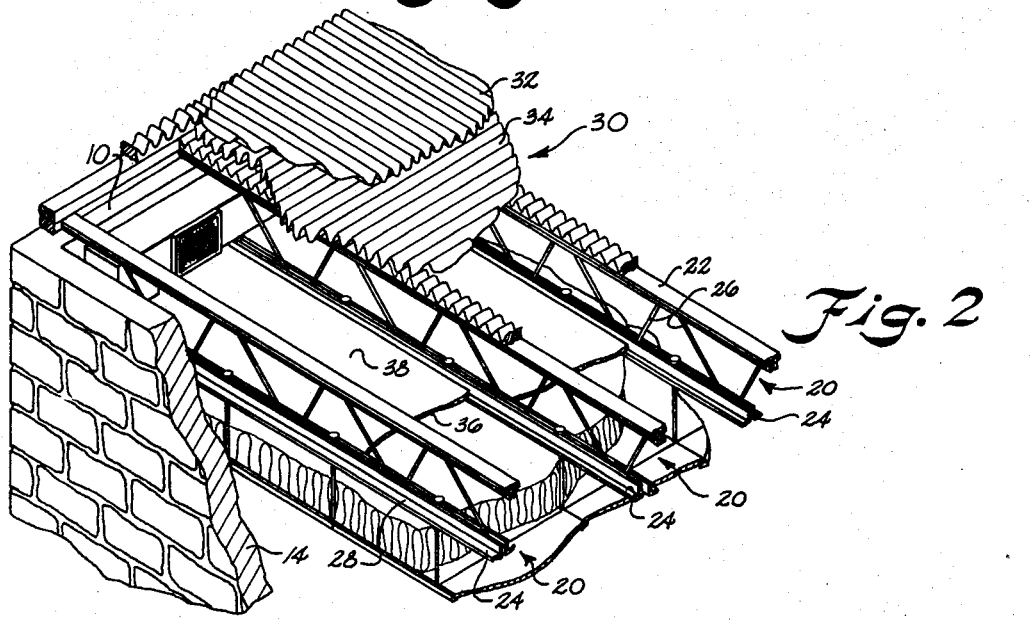
FIG. 2 is an enlarged perspective view with parts broken away for purposes of clarity illustrating the combined roof structure and solar collector constructed in accordance with the present invention.
Figure 3:
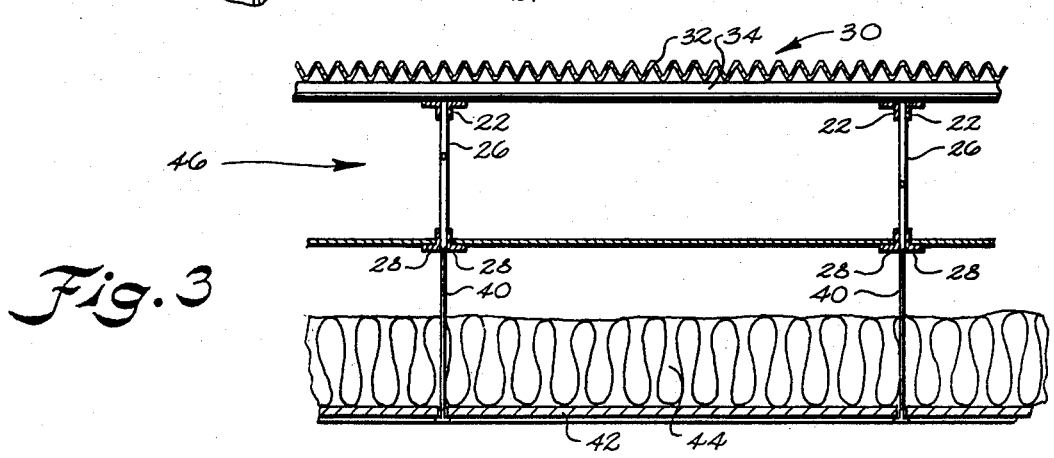
FIG. 3 is an enlarged sectional view illustrating the components of the combined roof structure and solar collection.

As illustrated in FIGS. 1, 2, and 3, the roof is constructed of a plurality of laterally spaced bar joists 20 each of which includes an elongated upper member 22 and an elongated lower member 24 spaced vertically below the upper member 22. Braces in the form of metal rods 26 extend between the upper member 22 and the lower member 24. As illustrated in FIG. 2, the ends of the upper member 22 rest on top of the walls 10 and 12 for supporting the bar joists.

The upper members 22, the lower members 24, and the braces 26 in one particular embodiment are made of steel. The lower members 24 include a pair of angle irons that are welded together to produce laterally extending flanges 28.

Positioned on top of the elongated upper members 22 is a translucent panel 30 which is constructed of a pair of translucent corrugated members 32 and 34. The translucent panel may take the form of the panel illustrated in my previously mentioned U.S. Pat. No. 4,027,447. As illustrated in that patent, the edges of the panels are sealed relative to each other. The panels may be secured to the top of the upper members by any suitable means such as bolts.

Lower panels 36 are carried between opposed flanges 28 of the lower members of the truss. These panels may be constructed of any suitable material such as plywood and have a black solar absorbing surface 38 provided thereon. The black surface may be of any suitable material such as black paint as long as it absorbs the heat from the solar energy.

As illustrated in FIGS. 1 and 3, hung from the bar joists by vertical members 40, is a ceiling structure 42 constructed of any suitable conventional ceiling panels. Positioned on top of the ceiling panels 42 is a layer of black insulation 44. The insulation insulates the chamber generally designated by the reference character 46 from the interior of the building.

In operation, an air conveying system 48 circulates air through ducts 50 through the rock bed 18, and up through a duct 52 provided on the left hand side of the wall. The bottom of the duct 48 communicates with the rock bed 18 for heating the rocks with the heated air flowing out of the chamber 46. The air will then either be recirculated through the attic or through the interior of the building. The manner in which the air is circulated through the building is more fully described in our previously granted U.S. Pat. No. 4,051,999.

As can be seen the combination roof structure and solar collector can be readily assembled and mounted on the top walls of a building structure with a minimum of effort. It can also be mounted on a wall of uneven height.

Figure 4:
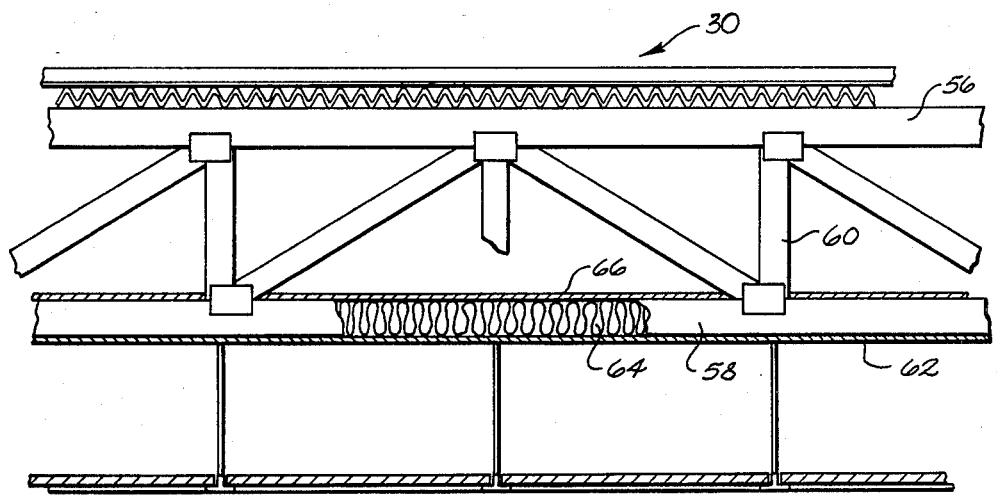
FIG. 4 is a sectional view illustrating a modified form of the invention.

In FIG. 4 instead of using bar joists, a truss is utilized, which is constructed of elongated horizontally extending upper member 56, which may take the form of a 2×6 board. Positioned below the upper member 56 is a lower member 58, which may take the form of another 2×6 board. Wooden braces 60 extend between the upper member 56 and the lower member 58. Positioned directly on top of the upper members 56 is a translucent panel 30 such as shown in our previous U.S. Pat. No. 4,027,447. A plywood board 62 is nailed to the bottom of the lower member 58 and has positioned thereon a layer of insulation 64, often referred to as duct liner, which has a black surface 66 provided on the top thereof. This black surface 66 acts as a solar collector. Hung from the lower members 58 is a drop ceiling 68.

Figure 5:
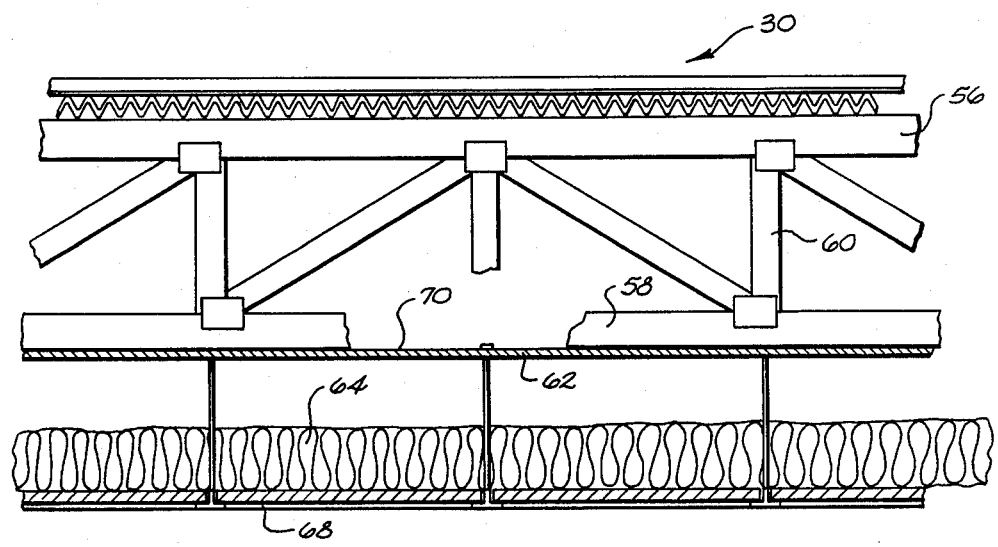
FIG. 5 is a sectional view of still another modified form of the invention.

In FIG. 5, instead of the insulation 64 being positioned directly on top of the plywood 62 it is carried on top of the drop ceiling 68. The upper surface of the plywood sheet 62, which is nailed to the bottom member 58 of the truss, has a black surface 70 painted thereon. This produces a solar collector.

A chamber is defined between the black surface 70 and the translucent panel. In this chamber the air is heated for circulating through the building similar to that shown in FIG. 1.

While a preferred embodiment of the invention has been described using specific terms, such description is for illustrative purposes only, and it is to be understood that changes and variations may be made without departing from the spirit or scope of the following claims.

What is claimed is:

1. A combination roof structure and solar collector for a building having vertical side walls and end walls comprising:
   a plurality of laterally spaced bar joists extending from one of said walls to an opposite wall;
   said bar joists including:
   (i) an elongated upper member,
   (ii) an elongated lower member vertically spaced below said upper member,
   (iii) braces extending between said upper member and said lower member,
   (iv) laterally extending flanges projecting outwardly in opposite directions from said lower member,
   a translucent panel carried on top of said upper members providing a roof structure for said building while permitting solar energy to pass therethrough;
   lower panels carried on and extending between the flanges of said lower members spanning an area directly below said translucent panel;
   a solar energy absorbing surface carried on said panels which are carried on said flanges;
   insulation material carried below said lower panels for insulating said interior of said building from said solar energy absorbing surface;
   a chamber provided between said solar energy absorbing surface and said translucent panel;
   means for circulating air through said chamber absorbing heat from said solar energy absorbing surface and supplying said air to said building.

2. A combination roof structure and solar collector for a building having vertical side walls and end walls comprising:
   a plurality of laterally spaced trusses extending from one of said walls to an opposite wall;
   said truss including:
   (i) an elongated horizontally extending upper member,
   (ii) an elongated lower member vertically spaced below said upper member,
   (iii) braces extending between said upper member and said lower member,
   a translucent panel carried on top of said upper members providing a roof surface for said building while permitting solar energy to pass therethrough into said building; panels attached to said elongated lower members defining a chamber between said upper members and said lower members;
   a solar energy absorbing surface carried above said panels attached to said lower members;
   a layer of insulation insulating the interior of said building from said chamber; and
   means for circulating air through said chamber absorbing heat from said solar energy absorbing surface and supplying said heated air to the interior of said building.

3. The combination roof structure and solar collector as set forth in claim 1 wherein said layer of insulation is carried on said panels attached to said lower members, and said solar energy absorbing surface is carried on said layer of insulation.

* * * * *